United States Patent Office 3,798,283
Patented Mar. 19, 1974

3,798,283
NON-CATALYTIC OXIDATIVE DEHYDROGENATION PROCESS
Lou S. Bitar, Rikswijk, Netherlands, David S. Smallwood, Philadelphia, Pa., and Elliot N. Lang, Guadalajara, Jalisco, Mexico, assignors to Atlantic Richfield Company, Los Angeles, Calif.
No Drawing. Continuation-in-part of abandoned application Ser. No. 56,722, July 20, 1970. This application Mar. 8, 1972, Ser. No. 232,928
Int. Cl. C07c 3/28
U.S. Cl. 260—683.3                        9 Claims

ABSTRACT OF THE DISCLOSURE

Conversion of propane to propylene by oxidative dehydrogenation with a high selectivity to propylene at a given propane conversion level is carried out by the reaction of propane and sufficient molecular oxygen at temperatures of about 890° F. to 940° F. to maintain an excess partial pressure of oxygen in the reaction zone either by the use of total pressures above atmospheric pressure or by the use of an oxygen-rich feed or by a combination of both, the excess partial pressure of oxygen in the reaction zone being characterized by a specific oxygen partial pressure range in the effluent gas stream.

CROSS REFERENCE TO RELATED APPLICATION

This aplication is a continuation-in-part of our copending application Ser. No. 56,722, filed July 20, 1970, now abandoned, entitled Non-Catalytic Oxidative Dehydrogenation Process for Preparing Propylene.

BACKGROUND OF THE INVENTION

Field of the invention

This invention relates to an oxidative dehydrogenation process for the conversion of propane to propylene using molecular oxygen. More specifically, the invention relates to increasing the selectivity to propylene at a given propane conversion rate thereby increasing the yield of propylene and making the process more economically advantageous when compared to other processes for preparing propylene such as high temperature cracking.

Description of the prior art

The basic oxidative dehydrogenation reaction is well known in the prior art. At temperatures below 750° F. the predominant products are liquid hydrocarbons such as aldehydes, alcohols, ketones and acids. Most prior work in preparing propylene and other gaseous olefins involved the use of catalysts. For example, Neale U.S. 3,218,368, Nov. 16, 1965, shows a process for reacting oxygen and an alkane to produce an alkene at temperatures from 400° C. to 600° C. (752° to 1112° F.) with contact times from 1 to 30 seconds at non-critical pressures over catalyst comprising vanadium alone or in combination with certain other metals. Fenske et al., 3,006,944, Oct. 31, 1961, show a vapor phase oxidative dehydrogenation at between 500° and 750° C. (932° to 1382° F.) but require a non-homogeneous "raining solids" reactor system to remove the heat of reaction and permit larger proportions of oxygen. The advantages of an economical process which avoids the necessity for catalyst or complicated raining solids system has been recognized in the art but no adequate solution has been proposed. An alternative process in the prior art was to use a halogen such as iodine or bromine instead of oxygen to react with the propane to form propylene and hydrogen halide. This process is much more expensive than one which uses oxygen and involves the problem of separating hydrogen halides from the reaction products.

Newitt et al., J. Chem. Soc., 1937, pages 1665 to 1669 as confirmed by Medley et al., Advances in Petroleum Chemistry and Refining, 1960, at page 333 teach oxidation of propane at elevated pressures increases the yield of isopropyl alcohol and acetone but diminishes the yield of propylene. Newitt et al. state that "it should be noted that propylene, present to the extent of 25 percent at atmospheric pressure, is entirely absent at high pressure." Thus, if one desired increased propylene selectivity, elevated pressure was to be avoided.

U.S. Pat. 3,297,777 (Jan. 10, 1967) to Grantom et al. describes a "non-catalytic partial combustion" method for the conversion of low molecular weight saturated hydrocarbons to normally gaseous monoolefin hydrocarbons having at least 1 carbon atom less than the starting saturated hydrocarbon. Thus in the examples, butane is cracked to ethylene and propylene with the ethylene predominating. The process is carried out in the range of from 1000° F. to 1500° F. with extremely short residence times of the order of 0.005 to 0.5 seconds achieved by employing a reactor of specific design consisting of 2 chambers connected by a venturi opening in a converging and diverging nozzle arrangement. The patentees teach that the combustion of the feed hydrocarbon is started by an igniting surface such as a sparkplug or by preheating the feed to a temperature sufficiently high to cause combustion. The reaction mixture is rapidly passed through the venturi into the second chamber where it expands and cools. The patentees teach that the heat liberated by the combustion reaction finally makes it autogenous.

The instant invention provides numerous advantages over the prior art, it is non-catalytic and neither requires nor employs igniting surfaces since it is not a combustion reaction. The reaction is non-self-sustaining and thus requires a constant heat suply to the reactor which permits maintaining within the reactor a narrow reaction temperature range. External heat must be applied to the reaction zone for maintaining the oxidative dehydrogenation reaction.

It has been found that an excess partial pressure of oxygen in the reactor at a given conversion level is beneficial to the selectivity for production of propylene. When the partial pressure of oxygen in the reactor zone is in this excess there will be a specific range of oxygen partial pressure in the effluent gas. In other words, there is a sufficient excess of oxygen such that the reaction does not consume all of the oxygen introduced into the reactor. It has been found that if the reaction is carried out at a pressure slightly above atmospheric pressure the selectivity for the production of propylene is increased at a given conversion level over that which is obtainable at atmospheric pressure at the same conversion level and, thus, the oxygen consumed is less, i.e. there is the desired partial pressure of oxygen in the exit gases. Alternatively, if an oxygen-rich feed stream is employed there is also obtained a higher selectivity for the conversion of propane to propylene as evidenced by the desired partial pressure of oxygen in the exit gases. Likewise, the combination of slightly superatmospheric pressures together with an oxygen-rich feed stream also provides the desired partial pressure of oxygen in the exit gases.

Finally, the instant reaction is characterized by the predominant reaction being the conversion of a $C_3$ paraffin to a $C_3$ olefin which is contrary to the prior art partial combustion or oxidative cracking methods, wherein the reaction products contained one or more carbon atoms less than the starting paraffin.

SUMMARY OF THE INVENTION

It is therefore an object of this invention to provide a process for the oxidative dehydrogenation of propane to produce propylene in higher selectivity and increased yields.

It is a further object to prepare propylene from propane in the absence of a catalyst or "raining solids" system, while avoiding the use of a halogen.

It is a still further object to provide a process for oxidatively dehydrogenating propane with reduced total oxygen consumption.

These and other objects are accomplished by the process of this invention which comprises reacting propane with oxygen in the absence of a catalyst or raining solids reactor at temperatures from about 890° F. to 940° F. preferably 910° F. to 920° F. by the use of superatmospheric pressure or excess feed oxygen or both to provide a specific oxygen partial pressure in the effluent gases.

DESCRIPTION OF THE PREFERRED EMBODIMENT

The apparatus employed in our invention includes both metallic and non-metallic reactors; the use of a raining solids type of reactor is not included within the scope of our invention. The reactor may be lined with any suitable material such as alumina, borosilicate glass, aluminum metal, stainless steel, aluminum coated nickel, or any other material which can withstand the temperatures and does not inhibit the reaction. The particular geometry of the reactor is not critical and does not constitute part of the invention.

The temperatures suitable are from about 890° F. to about 940° F. The molecular oxygen may be diluted with inert gases such as steam, nitrogen, argon or similar inert gases, i.e. gases non-reactive with the propane. The preferred temperature range is from 910° F. to 920° F. Increased temperatures cause higher conversion rate but lower selectivity to propylene and higher selectivity to combustion products such as carbon dioxide and coke.

A homogeneous system is employed in the invention. Neither the use of a catalyst nor the use of a raining solids system is within the scope of the invention.

The residence time is on the order of from above 0.5 seconds to about 10 seconds or higher if the higher conversion levels are desired as will be shown hereinafter. Preferably, the residence time is from above 0.5 second up to 5 seconds, particularly if an oxygen-rich feed is employed to obtain the desired excess oxygen partial pressure in the reaction zone to give the desired range of oxygen partial pressure in the exit gases. An oxygen-rich feed contains a mole ratio of propane to oxygen of from about 1.5:1 to 1:1. When conversion is increased, propylene selectivity is decreased. Residence time, conversion, partial pressure of oxygen in the exit or effluent gases all influence the selectivity of propylene production while it has been found that the temperature range is rather critical and narrow since it must be high enough to give the desired oxidative dehydrogenation reaction, i.e. at least 890° F. and preferably 910° F. while not being so high as to promote the undesired combustion reaction, i.e. about 940° F., but preferably only 920° F. as the upper limit.

The unreacted propane is recycled to the reaction zone and so it is an advantage to have higher conversion rates in order to reduce the amount of recycle necessary. The ratio of propane to oxygen may range from 10:1 to 1:1. Optionally, the oxygen-propane mixture may be diluted with an inert gas such as nitrogen so that air may be used instead of pure oxygen. However, this requires larger equipment and provides lower yields.

An excess of oxygen is maintained throughout the reactor. This excess oxygen may be maintained by adjusting the mole ratio of oxygen to propane at the particular residence time and temperature such that there is a positive partial presure of oxygen at the exit of the reactor. The preferred range of exit oxygen partial pressure is from about 1 to about 10 p.s.i.a. The excess of oxygen has been found to have a beneficial effect on the selectivity of the reaction to propylene at a given conversion rate.

Another means of obtaining the preferred range of exit oxygen partial pressure is by the use of superatmospheric pressure in the reaction zone. Superatmospheric pressure has been found to give an unexpectedly beneficial effect on propylene selectivity. Thus, in the conversion of 1 mole of propane to 1 mole of propylene by oxidative dehydrogenation only ½ mole of oxygen is required. It follows that as the selectivity for production of propylene increases at any given conversion level oxygen consumption decreases and the partial pressure of oxygen (concentration) in the reaction zone increases which in turn is characterized by a higher exit oxygen partial pressure, i.e. a higher concentration of oxygen in the effluent gases. It also follows of course, that with increased propylene selectivity at a given conversion there will be decreased production of other by-products including carbon monoxide and carbon dioxide. In general, it has been found that suitable pressures range from about 15 p.s.i.a. (slightly above atmospheric) to about 50 p.s.i.a. with preferred pressures being from about 20 to 50 p.s.i.a. and with the most preferred range being from 20 to 30 p.s.i.a. At pressures above 50 p.s.i.a. olefin selectivity decreases rapidly in favor of increased production of oxygenated liquid products such as aldehydes, ketones, alcohols, acids, etc.

To further illustrate the invention, the following examples are presented. It is to be understood that these examples are merely illustrative and in no way limiting.

EXAMPLE I

At a temperature of 910°–920° F., a feed consisting of 40 mole percent propane, 12 mole percent oxygen, and 48 mole percent nitrogen was passed through an alumina pipe reactor. The conversion level in this example was maintained at a constant 10 percent based upon the weight of the propane. As shown in the following table, at increased reactor pressure and decreased residence time, the selectivity to propylene was unexpectedly increased and the oxygen consumption was unexpectedly decreased.

TABLE I
10% conversion of propane

| | | |
|---|---|---|
| Pressure, p.s.i.a. | 15 | 22 |
| Residence time, sec. | 6 | 3 |
| Percent: | | |
| O₂ consumption | 40 | 27 |
| Propylene selectivity [1] | 76.5 | 84.0 |
| Ethylene selectivity [1] | 12.9 | 9.5 |
| Methane selectivity [1] | 7.6 | 3.5 |
| CO and CO₂ selectivity [1] | 3.0 | 3.0 |
| Total products | 100.0 | 100.0 |

[1] Based on weight percent of propane reacted.

EXAMPLE II

Following the procedure of Example I, but maintaining a constant 20 percent propane conversion, the following selectivities resulted:

TABLE II
20% conversion of propane

| | | |
|---|---|---|
| Pressure, p.s.i.a. | 15 | 22 |
| Residence time, sec. | 20 | 9 |
| Percent: | | |
| O₂ consumption | 80 | 63 |
| Propylene selectivity [1] | 64.0 | 72.0 |
| Ethylene selectivity [1] | 18.7 | 14.3 |
| Methane selectivity [1] | 11.7 | 7.7 |
| CO and CO₂ selectivity [1] | 5.6 | 6.0 |
| Total products | 100.0 | 100.0 |

[1] Based on weight percent of propane reacted.

EXAMPLE III

Following the procedure of Example I, but maintaining constant 30 percent propane conversion, the following selectivities resulted:

TABLE III
30% conversion of propane

| | | |
|---|---|---|
| Pressure, p.s.i.a. | 15 | 22 |
| Residence time, sec. | 80 | 36 |
| Percent: | | |
| $O_2$ consumption | 99 | 92 |
| Propylene selectivity [1] | 55.2 | 62.0 |
| Ethylene selectivity [1] | 21.8 | 19.5 |
| Methane selectivity [1] | 14.5 | 8.0 |
| CO and $CO_2$ selectivity [1] | 8.5 | 10.5 |
| Total products | 100.0 | 100.0 |

[1] Based on weight percent of propane reacted.

Examples I, II and III demonstrate that an increased reactor pressure at the same propane conversion level requires shorter residence times, gives decreased oxygen consumption and gives increased propylene selectivity. It has also been found that the decreased oxygen consumption also results in an increase in the partial pressure of oxygen in the exit gases. Moreover, these examples demonstrate that the predominant reaction is conversion of the propane to propylene, i.e. a reaction wherein there is no loss in carbon number of the product. As the propane conversion level increases however, the yield of propylene decreases. It will be noted however, that the increase in pressure is effective not only in increasing the selectivity for the production of propylene, but also decreases the selectivity for the production of undesired products the only exception being a very small increase in the amount of carbon monoxide and carbon dioxide produced at the high conversion levels. This demonstrates the totally unexpected results obtained by the method of the instant invention as compared with the above-discussed prior art methods.

EXAMPLE IV

In additional runs the oxygen partial pressure was increased at the reactor exit and throughout the reactor by employing oxygen concentrated feeds of (1) 60 mole percent propane—40 mole percent oxygen in one run and (2) 30 mole percent propane—30 mole percent oxygen—40 percent nitrogen in a second run, and decreasing the reactor residence time to approximately 1 second at a temperature of 915° F. at about atmospheric pressure. By operating in this manner exit oxygen partial pressures of 3 p.s.i.a. (15 mole percent) were maintained at propane conversion levels of 30–40 percent, with the corresponding increase in selectivity to propylene as shown in the foregoing examples wherein total pressures of about 22 p.s.i.a. were employed.

EXAMPLE V

To show the effect of maintaining a positive partial pressure of oxygen in the exit stream on propylene selectivity, propane and oxygen were introduced in a back mix reactor at 915° F. and residence time and oxygen concentration regulated to maintain a constant 10 percent propane conversion according to the following table.

TABLE IV
10% propane conversion

| | | |
|---|---|---|
| Exit $O_2$ partial pressure, p.s.i.a. | 0.15 | 3.0 |
| Mole percent of exit stream $O_2$ | 1 | 15 |
| Propylene selectivity [1] | 70 | 85 |
| Ethylene selectivity [1] | 14 | 5 |
| Methane selectivity [1] | 12 | 6 |
| CO and $CO_2$ selectivity [1] | 4 | 4 |
| Total products | 100 | 100 |

[1] Weight percent based on propane reacted.

It should be observed that the propylene selectivity of 85 percent, when compared to the ethylene selectivity of 5 percent, provides a unit ratio of 17 for the ratio of dehydrogenation to cracking when the partial pressure of oxygen in the exit gas is 3.0 p.s.i.a. Even when the exit oxygen pressure is only 0.15 p.s.i.a., the unit ratio of dehydrogenation to cracking ratio is 5. Any dehydrogenation to cracking unit ratio greater than 4 is highly advantageous.

EXAMPLE VI

Following procedure of Example V, only maintaining a 30 percent conversion level of propane, the following were obtained:

TABLE V
30% propane conversion

| | | |
|---|---|---|
| Exit $O_2$ partial pressure, p.s.i.a. | 0.15 | 3.0 |
| Mole percent of exit stream $O_2$ | 1 | 15 |
| Propylene selectivity [1] | 42 | 62.5 |
| Ethylene selectivity [1] | 27.5 | 14 |
| Methane selectivity [1] | 19.0 | 11.5 |
| CO and $CO_2$ selectivity [1] | 11.5 | 12 |
| Total products | 100.0 | 100.0 |

[1] Weight percent based on propane reacted.

It will be seen from these data that the increase in the partial pressure of oxygen in the exit stream provides a very marked increase in propylene selectivity while decreasing the amounts of ethylene and methane. The carbon dioxide and carbon monoxide selectivities remain virtually unchanged. From these data and the previous examples it will be observed also that any method which increases the partial pressure of oxygen within the reaction zone characterized by an increased partial pressure of oxygen in the exit stream in the range of from about 1 to 10 p.s.i.a. provides the desired increase in propylene selectivity at any given propane conversion level.

While it has been found that increasing the oxygen partial pressure in the reaction zone and hence in the exit gases can be accomplished by increasing the total pressure up to about 50 p.s.i.a. and thus improving propylene selectivities the same is not observed by increasing the oxygen content of the feed, thus it has been found that if extremely oxygen-rich feeds are employed, for example 95 mole percent oxygen, 5 mole percent propane, propane selectivity decreases very markedly and carbon monoxide and carbon dioxide are produced in very high yields, although the exit oxygen partial pressure is of the order of 15 p.s.i.a. This demonstrates that it is necessary to operate within a restricted range of oxygen partial pressure as has been described, since the beneficial effects of oxygen partial pressures in the exit gas are not realized above the 10 p.s.i.a. limit.

Additional runs have been carried out at temperatures of 850° F. and at 1000° F. At the 850° F. temperature level it was observed that an improvement in propylene selectivity could be obtained by a total pressure increase, for example, but the yields were at too low a level to be useful and such reactions were in the range wherein various other oxidation products are produced which are undesired. Accordingly, a lower temperature range of about 890° F. is the most practical, with 910° F. being the most preferred. Likewise at temperatures above about 940° F. combustion reactions become increasingly important with the result that a large amount of the feed is converted to carbon monoxide and carbon dioxide which are completely useless by-products, and at 1000° F. oxygen consumption is complete with the result that there is an exceedingly marked decrease in propylene selectivity and, accordingly, these temperatures are to be avoided when using the oxidative dehydrogenation method of this invention. The most preferred upper temperature for the reaction is 920° F. since an increased partial pressure of oxygen can be maintained within the reaction zone resulting in increased propylene selectivity and characterized by partial pressure of oxygen in the exit gases of from 1 to 10 p.s.i.a.

Additional runs at higher pressures, for example at 35 p.s.i.a., have shown improved propylene selectivities, however, as has been pointed out pressures above about 50 p.s.i.a. should be avoided for the reasons set forth.

We claim:

1. A process for the non-self-sustaining oxidative dehydrogenation of propane to produce propylene with molecular oxygen at high propylene selectivities based on the propane converted which comprises contacting a mixture comprising propane and molecular oxygen, said mixture being passed through a reaction zone maintained at temperatures in the narrow range of from about 890° F. to 940° F. by constantly supplying heat to the reaction zone in the substantial absence of a catalyst and wherein the extent of conversion of the propane is sufficiently restricted to provide a partial pressure of oxygen in the exit gases ranging from about 1 to 10 p.s.i.a.

2. The method according to claim 1, wherein the temperature is in the range of 910° F. to 920° F.

3. The process according to claim 1, wherein the reaction is carried out at superatmospheric pressure in the range of from about 15 p.s.i.a. to 50 p.s.i.a.

4. The process according to claim 2, wherein the pressure is in the range of from about 20 to 50 p.si.a.

5. The process according to claim 2, wherein the pressure is in the range of from about 20 to 30 p.s.i.a.

6. The process according to claim 1, wherein the molecular oxygen is diluted with an inert gas.

7. The process according to claim 1, wherein the residence time is in the range of from about above 0.5 second up to 5 seconds.

8. The method according to claim 1 wherein the reaction is carried out at a temperature in the range of from 910° F. to 920° F. at a pressure in the range of from 20 p.s.i.a. to 50 p.s.i.a.

9. The method according to claim 7, wherein the reaction is carried out at a temperature in the range of 910° F. to 920° F. and the mole ratio of propane to oxygen in the initial reaction mixture is within the range from 10:1 to 2:1.

References Cited

UNITED STATES PATENTS

| | | | |
|---|---|---|---|
| 3,297,777 | 1/1967 | Granton et al. | 260—683.3 |
| 3,170,863 | 2/1965 | Spillane et al. | 260—683.3 X |
| 3,268,615 | 8/1966 | Keenan et al. | 260—683.3 |
| 3,579,601 | 5/1971 | Kivlen | 260—683 |

DELBERT E. GANTZ, Primary Examiner

J. M. NELSON, Assistant Examiner

U.S. Cl. X.R.

260—683 R